United States Patent
Khosla et al.

(10) Patent No.: US 9,232,378 B2
(45) Date of Patent: Jan. 5, 2016

(54) LOCATING A VICTIM VIA A FIRST RESPONDER'S DEVICE

(71) Applicant: QUALCOMM Incorporated, San Diego, CA (US)

(72) Inventors: Chetan Khosla, Boulder, CO (US); Lee Giacoletto, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 13/682,649

(22) Filed: Nov. 20, 2012

(65) Prior Publication Data

US 2014/0011471 A1    Jan. 9, 2014

Related U.S. Application Data

(60) Provisional application No. 61/667,846, filed on Jul. 3, 2012.

(51) Int. Cl.
*H04W 64/00* (2009.01)
*H04W 4/22* (2009.01)
*H04W 4/02* (2009.01)

(52) U.S. Cl.
CPC . *H04W 4/22* (2013.01); *H04W 4/02* (2013.01)

(58) Field of Classification Search
None
See application file for complete search history.

(56) References Cited

U.S. PATENT DOCUMENTS

| 6,047,178 | A | 4/2000 | Frlan |
| 6,466,767 | B1 | 10/2002 | Lidbrink et al. |
| 6,980,815 | B1 | 12/2005 | Enzmann et al. |
| 7,398,086 | B2 * | 7/2008 | Morgand et al. |
| 2002/0183073 | A1 * | 12/2002 | Morgand et al. ............. 455/456 |
| 2005/0176403 | A1 * | 8/2005 | Lalos ........................ 455/404.1 |
| 2005/0197125 | A1 * | 9/2005 | Kang et al. .................. 455/439 |
| 2006/0009191 | A1 * | 1/2006 | Malone, III ............... 455/404.1 |
| 2006/0126558 | A1 * | 6/2006 | Lee et al. ...................... 370/329 |
| 2006/0152373 | A1 * | 7/2006 | King .......................... 340/573.1 |
| 2006/0154643 | A1 | 7/2006 | Scholz et al. |
| 2007/0176826 | A1 * | 8/2007 | Daniele et al. ................ 342/465 |
| 2008/0299939 | A1 | 12/2008 | Apodaca et al. |
| 2011/0249649 | A1 | 10/2011 | Pulugurta |
| 2013/0143576 | A1 | 6/2013 | Kurz |

FOREIGN PATENT DOCUMENTS

| WO | WO-2012007151 A1 | 1/2012 |
| WO | WO-2012087190 A1 | 6/2012 |

OTHER PUBLICATIONS

International Search Report and Written Opinion—PCT/US2013/049154—ISA/EPO—Nov. 21, 2013.

* cited by examiner

*Primary Examiner* — Quan M Hua
(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for locating a victim via a first responder's device for use in or with a mobile communication device.

67 Claims, 3 Drawing Sheets

LOCATING A VICTIM VIA A FIRST RESPONDER'S DEVICE

CROSS-REFERENCE TO RELATED APPLICATIONS

The present application claims priority under 35 U.S.C. §119 to U.S. Provisional Patent Application Ser. No. 61/667,846, entitled "Locating a Victim via a First Responder's Device," filed on Jul. 3, 2012, which is assigned to the assignee hereof and which is expressly incorporated herein by reference.

BACKGROUND

1. Field

The present disclosure relates generally to position or location estimates of mobile communication devices and, more particularly, to locating a victim via a first responder's device for use in or with mobile communication devices.

2. Information

Mobile communication devices, such as, for example, cellular telephones, personal digital assistants, electronic book readers, portable navigation units, laptop computers, or the like are becoming more common every day. As geographic barriers to personal travel decrease, mobile communication devices play a significant role in allowing society to maintain its mobility. Continued advancements in information technology, communications, mobile applications, etc. help to contribute to a rapidly growing market for mobile communication devices, which have become ubiquitous and may already be viewed as "extensions of the hand" altering the manner in which society communicates, does business, or creates value.

Certain mobile communication devices, such as location-aware cellular telephones, smart telephones, or the like may, for example, assist in estimating their geographic locations by communicating with one or more wireless transmitters or receivers over a suitable communications network. For example, mobile communication devices may assist in estimating their relative locations based, at least in part, on wireless signals received or acquired from one or more base stations, access points, location beacons, femtocells, or the like via a cellular telephone or like wireless network using known techniques. In some instances, however, such as, for example, in an emergency situation or like event (e.g., a natural disaster, etc.), a functioning or active cellular or like wireless communications network or associated service may not be available.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
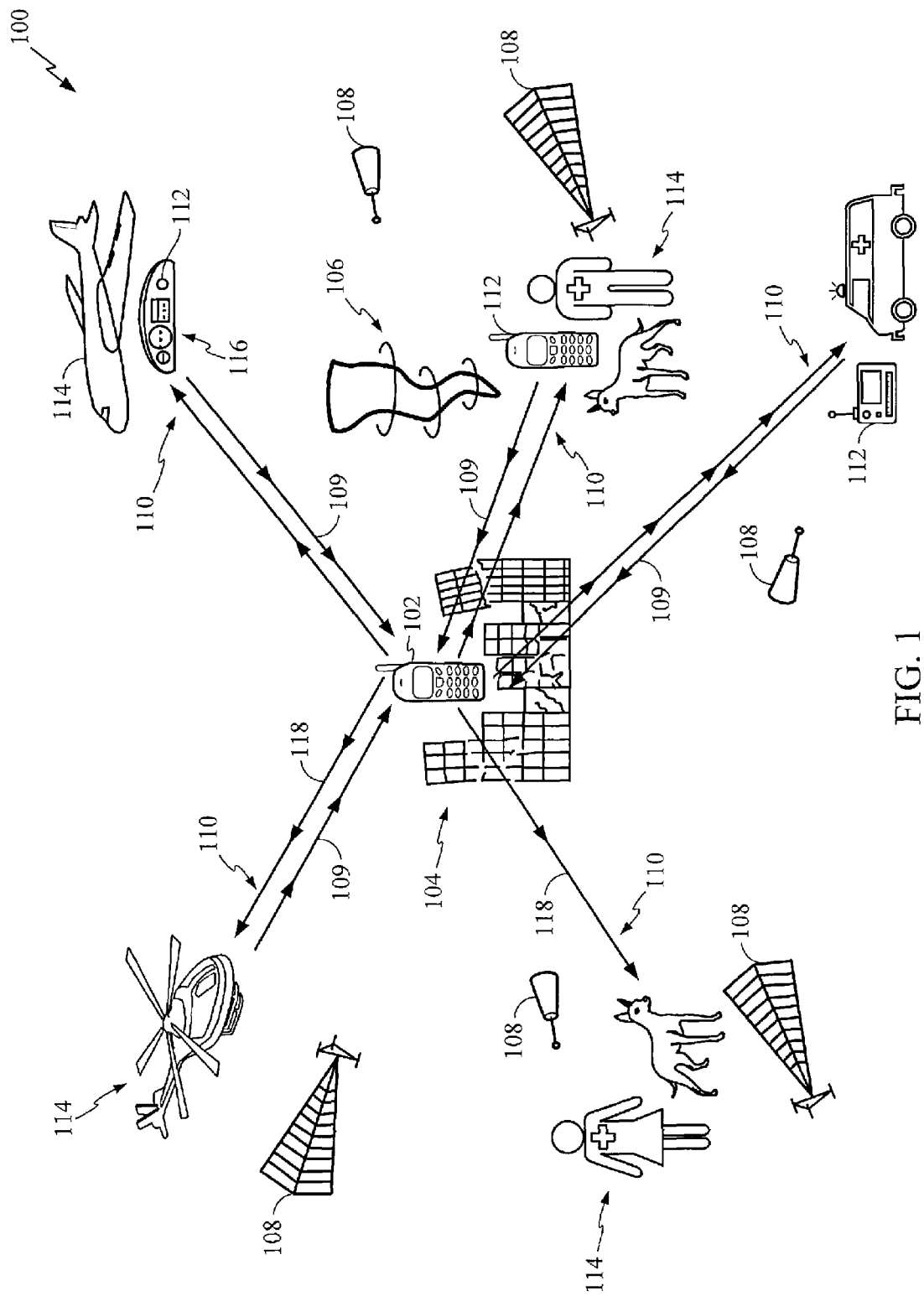
FIG. 1 is an example signaling environment in which one or more techniques for locating a victim via a first responder's device may be performed according to an implementation.

Example implementations relate to locating a victim via a first responder's device for use in or with a mobile communication device. In one implementation, a method may comprise emulating, at a first mobile device, behavior of a cellular base station by broadcasting a pilot signal; receiving a response signal to the broadcasted pilot signal from a second mobile device, the response signal being received while a wireless communications network service is unavailable; and approximating a location of the second mobile device based, at least in part, on the response signal.

In another implementation, a mobile device may comprise a wireless transceiver to communicate with a second mobile device; and at least one processor programmed with instructions to emulate behavior of a cellular base station by broadcasting a pilot signal via the wireless transceiver; receive, at the wireless transceiver, a response signal to the broadcasted pilot signal from the second mobile device, the response signal being received while a wireless communications network service is unavailable; and approximate a location of the second mobile device based, at least in part, on the response signal.

In yet another implementation, an apparatus may comprise means for emulating, at a first mobile device, behavior of a cellular base station by broadcasting a pilot signal; means for receiving a response signal to the broadcasted pilot signal from a second mobile device, the response signal being received while a wireless communications network service is unavailable; and means for approximating a location of the second mobile device based, at least in part, on the response signal.

In yet another implementation, an article may comprise a non-transitory storage medium having instructions stored thereon executable by a special purpose computing platform at a first mobile device to initiate broadcast of a pilot signal to emulate behavior of a cellular base station; obtain a response signal to the broadcasted pilot signal received from a second mobile device, the response signal being received while a wireless communications network service is unavailable; and approximate a location of the second mobile device based, at least in part, on the response signal. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for locating a victim via a first responder's device for use in or with mobile communication devices. As used herein, "mobile communication device," "mobile device," "wireless device," "hand-held device," "location-aware mobile device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols.

As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely illustrative examples of mobile devices that may be used, at least in part, to implement one or more operations or techniques for locating a victim via a first responder's device, and that claimed subject matter is not limited in this regard.

As alluded to previously, mobile devices may, for example, assist in locating a victim, such as a user or owner of the mobile device in an emergency situation by providing an alert or requesting an emergency response to a location of the mobile device as part of a 911-type emergency response service (e.g., 911, E911, E112, etc.). For example, in an emergency situation, a mobile device may communicate a distress message along with its location estimate via a cellular or like communications network to a call center, which may dispatch an appropriate first response team (FRT) or emergency response team (ERT) to the estimated location. It should be noted that the terms "first response team" and "emergency response team" may be used interchangeably herein. It should also be appreciated that in some instances it may be presumed that a mobile device is relatively closely associated with its user or owner, such as, for example, co-located with or otherwise attached in some manner to the user's body (e.g., in a pocket, belt clip, backpack, etc.).

Typically, although not necessarily, a location of a user associated with a mobile device may, for example, be estimated based, at least in part, on wireless signals provided by one or more suitable communication devices or systems using any one of several location or position estimation techniques. For example, a mobile device may obtain a position estimate or so-called "position fix" by acquiring wireless signals from a satellite positioning system (SPS), cellular base station, access point, location beacon, femtocell, etc. via a cellular telephone or other wireless communications network. In some instances, received wireless signals may be processed in some manner by or at a mobile device, and its actual or relative geographic location may, for example, be estimated using known techniques, such as Advanced Forward Link Trilateration (AFLT), base station identification, or the like.

This system of providing an emergency response relies, however, on a functioning cellular or like wireless communications network service associated, for example, with a cellular provider network, wireless ad-hoc network, wireless safety network, or the like, which, at times, may present a number of challenges. For example, challenges may include the inability of a mobile device to initiate a transmission of a broadcast signal (e.g., indicative of a location, etc.) without first receiving a pilot-type or like signal from a radio signal source, such as a base station associated with an active cellular or like wireless communications network. For purposes of explanation, initially, such as at or upon turning on, rebooting, entering a coverage area, transitioning from an "airplane mode," etc., a mobile device may "listen" (e.g., wait, scan, search, etc.) for a pilot-type or like signal from one or more active or available cellular or like wireless communications networks. In some instances, a pilot-type or like signal may comprise, for example, a "ping"-type signal broadcasted by a radio signal source in accordance with one or more mobile telecommunications standards or protocols, such as IS-95, IS-856, IS-2000, or the like, as discussed below. A pilot-type signal may, for example, be descriptive of cell boundaries served by a radio signal source, provide for time reference, phase tracking or synchronization of a mobile device with a radio signal source, or the like.

In some instances, such as if no incoming or outgoing phone call is placed, for example, a mobile device may transition into an idle or so-called "sleep" mode or state. In an idle state, a mobile device may be capable of periodically "reading" or processing overhead messages broadcasted by a radio signal source in some manner, such as via a paging channel, for example, to provide information related to an associated active cellular or like wireless communications network. For purposes of explanation, typically, although not necessarily, an overhead message may comprise, for example, one or more parameters broadcasted periodically (e.g., every one, five, ten, etc. seconds) by a radio signal source within its coverage area for establishing or maintaining communications with applicable mobile devices. An overhead message may include, for example, one or more system parameters (e.g., for a CDMA, GSM, etc. cellular system, etc.), access parameters (e.g., call origination requirements, etc.), a list of setup channels, a list of neighboring base stations, or the like. At times, an overhead message may, for example be followed by a message directed to a particular mobile device. Subsequently, a mobile device may, for example, transmit access responses so as to register with an active cellular or like wireless communications network associated with a radio signal source, request access for originating a call, obtain other network-related information, or the like.

While in an idle state, a mobile device may periodically "wake up," such as in accordance with a sleep timer or like device and may "read" one or more overhead messages, sequence numbers associated with overhead messages, or like information. In some instances, such as if no call is incoming, a mobile device may go back to sleep without reading an overhead message, for example, if a sequence number is the same as the number received the last time the mobile device woke up. At times, a mobile device may stay awake longer, however, such as if one or more calls are incoming, for example, and may read associated overhead messages to determine if a particular call is directed or should be completed to the mobile device. Of course, these are merely details relating to communications with a radio signal source, and claimed subject matter is not so limited.

At times, having received a pilot-type or like signal, such as in accordance with a cellular access probe activity discussed above, a mobile device may then be capable to initiate a transmission of a so-called standard "present" signal. Typically, although not necessarily, a standard "present" signal may refer to a radio frequency (RF) signal transmitted by a mobile device in response to a received pilot-type or like signal to announce its presence in an area. A standard present signal may, for example, be broadcasted by a mobile device for the purpose of establishing or acquiring applicable cellular network service or coverage, to indicate a particular location, provide a subscription identification number, mobile telephone number, or the like. In other words, in accordance with current standards for cellular communications, a transmission of a broadcast radio signal is typically initiated by a radio signal source (e.g., a base station, etc.) associated with an active or functioning cellular or like wireless network service rather than a mobile device.

In an emergency situation, however, such as, for example, in a widespread natural disaster (e.g., an earthquake, tsunami, tornado, etc.), a functioning or active cellular or like communications network service may not be available. For example, otherwise normal operation of a cellular or like communications network service may fail due, at least in part, to a collapsed base station or like structural component associated with a fixed network topology (e.g., a switching center, etc.), loss of power at a network server, loss of a network link, or the like. As such, in an absence of a pilot-type or like signal from a base station or like radio signal source associated with a functioning or active wireless communications network service, a mobile device may remain "silent" or inactive with respect to broadcasting a signal (e.g., indicative of a location, etc.). Thus, in some instances, it may be relatively difficult or challenging for an ERT to locate a victim of an accident or natural calamity while a wireless communications network service is unavailable, particularly if a victim is not clearly visible, such as, for example, if caught in an avalanche, buried under a collapsed structure, or the like. As alluded to previously, terms "victim," "user," or "owner" may be used interchangeably herein.

Another challenge with typical approaches may be that, at times, a victim (e.g., of a natural disaster, etc.) may be incapacitated or unconscious and, as such, may be incapable of detecting an emergency situation in general or activating a mode for initiating a distress message or like signal in particular. Integrating a personal locator beacon with a mobile device, for example, may partially help in alerting appropriate authorities to an emergency but may rely on a user manually activating the beacon, such as by pressing a distress or like button on the mobile device. However, personal locator beacons, integrated or otherwise, are typically, although not necessarily, comprise location transponders that operate in a manner substantially similar to black boxes currently utilized in an aviation or maritime industry. As such, to facilitate or support search and rescue (SAR) operations, these devices may need to be compatible or otherwise interface with a Cospas-Sarsat or like satellite-based SAR system, such as by using, for example, one of three Cospas-Sarsat satellite-compatible emergency frequencies.

For purposes of explanation, if an integrated beacon is activated, such as by a user in distress, for example, a beacon's transmission is typically received by one or more satellites. A satellite then transmits a beacon's signal to a suitable ground control station, which processes the signal and forwards associated information (e.g., a location, etc.) to an appropriate national authority. In turn, a national authority forwards suitable information to an appropriate ERT or like rescue party to "zero-in" on a victim and conduct search and rescue. This so-called "uplink-and-downlink" communication along with associated signal processing, beacon identification, location determination, etc. may, for example, contribute to potentially lengthy delays in emergency responses, especially if a beacon is "anonymous" or unregistered. As such, in some instances, personal locator or like rescue beacons, integrated or otherwise, may be required to be registered with a national beacon registry, for example, which may also be inconvenient or time-consuming. In addition, rescue beacons may typically, although not necessarily, be single-use devices, meaning that once activated or used, a beacon may needs to be replaced or reprogrammed with a new beacon ID, hex code, or the like. Thus, re-registering a beacon with a beacon registry may, for example, increase cost, maintenance, complexity, etc. of an associated mobile device.

As previously mentioned, in some instances, a number of network components comprising, for example, a typically fixed infrastructure associated with an active cellular or like wireless communications network may be prone to failures. These failures may be manifested via, for example, packet loss, link congestion or failure, physical destruction of network infrastructure, etc. due, at least in part, to a variety of scenarios, such as a natural calamity, environmental disaster, electrical power outage, or the like. Network failures may result in a loss of a cellular or like wireless service, which may inhibit communications, lead to delays or errors in emergency responses, hinder disaster relief efforts, or the like. To remedy these or like situations as well as to address an unavailability of a wireless communications network service in a remote geographic area (e.g., for locating victims of an avalanche, etc.), a wireless emergency or like temporary networks may be deployed. Depending on a geographic area, terrain, situation, etc, these networks may include, for example, a wireless ad-hoc network, safety network, emergency network, satellite-based search and rescue (SAR) network, or the like.

In some instances, deployment of wireless emergency or like networks, however, may present a number of challenges. These challenges may include, for example, logistical aspects, such as physically moving or transporting a relatively large amount of a network-related infrastructure (e.g., nodes, routers, gateways, support equipment, etc.) to an affected area or site. This may be especially challenging if disaster relief is directed towards a remote or mountainous region, an area made inaccessible by rubbles in the aftermath of a natural disaster, such as an earthquake, or the like. At times, deployment of ad-hoc or like emergency networks may include operational challenges, such as, for example, unpredictable changes in a network topology due, at least in part, to node mobility, which may result in unreliable connectivity, network link partitions, packet losses, or the like, as was indicated. In addition, a multi-layered nature of typical emergency networks (e.g., to achieve scalability, etc.) may require relatively complex implementations to support multimedia access, neighbor discovery protocols, etc. under challenging working conditions, such as poor weather, power constraints, traffic load, channel congestion, or the like. To illustrate, limited power resources of a remotely deployed ad-hoc or like network may, for example, reduce or otherwise affect signal processing, addressing, routing, etc., which may influence quality of service (QoS) for SAR operations. Also, at times, an ad-hoc or like network may require access to or be dependent upon an active or functioning fixed wireless network (e.g., for back-end processing, etc.), such as a cellular provider network, for example, to facilitate or support wireless communications.

In other words, in some instances, rapid or suitable deployment of an emergency or like wireless network may, for example, be a relatively complex, expensive, or time-consuming undertaking. This may contribute to increased SAR response times, introduce delays in medical assistance, reduce or affect survival probabilities of victims of natural disasters, or the like. Accordingly, it may be desirable to develop one or more methods, systems, or apparatuses that may implement more effective or efficient location or position estimation of a mobile device (and an associated user), such as while a wireless communications network service is unavailable, for example. As alluded to previously, typically, although not necessarily, a wireless communications network service may be unavailable if, for example, one or more components of a network-related infrastructure (e.g., a base station, switching center, etc.) are physically destroyed or communicatively disrupted in some manner. For example, one or more network-associated circuits or links may be congested or overloaded, requisite wireless signals may be attenuated or otherwise affected in some manner (e.g., insufficient, weak, fragmentary, etc.) so as to preclude their use in an applicable communication, location or position estimation operation or technique. Of course, these are merely examples relating to an unavailability of a wireless communications network service, and claimed subject matter is not limited in this regard.

FIG. 1 is an implementation of an example signaling environment 100 in which one or more processes or operations for locating a victim via a first responder's device may be performed, in whole or in part. It should be appreciated that one or more processes or operations may, for example, be implemented for an urban search and rescue, mountain search and rescue, water search and rescue, air-sea or air-land search and rescue, or the like, or any combination thereof.

As illustrated, signaling environment 100 may include, for example, a mobile device 102 that may be associated with a user that may be trapped in a collapsed structure, as illustrated schematically at 104, following a natural disaster, such as an earthquake, tornado, or the like, referenced generally at 106. In some instances, due, at least in part, to a structural damage to one or more network components, as illustrated schematically via a number of toppled radio signal sources 108 (e.g., base stations, access points, etc.), a wireless communications network service may be unavailable. As previously mentioned, an unavailability of a cellular or like wireless communications network service may, for example, be manifested via dropped cell coverage, insufficient signal quality characteristics (e.g., signal strength, etc.), disappearance of a link from a known transmitter (e.g., radio signal source 108, etc.), or the like. Thus, as was also indicated, under current standards for cellular communications, in an absence of a pilot-type or like signal from one or more radio signal sources 108, for example, mobile device 102 may remain "silent" or refrain from broadcasting a signal indicative of its location, identity, subscription number, or the like.

Accordingly, signaling environment 100 may comprise, for example, a number of first responder's devices, such as wireless devices 112 that may be associated with one or more ERTs or other search and rescue parties, indicated generally at 114. As seen, ERT or other search and rescue party 114 may be supported by rescue vehicles, planes, helicopters, animals, or the like. As will be seen, one or more wireless devices 112 may be capable of emulating behavior of a cellular base station or like radio signal source, such as by broadcasting a pilot-type or like signal 109, for example. In some instances, pilot signal 109 may invoke an emergency mode of operation of mobile device 102, such as a present signal mode, modified present signal mode, etc. and may elicit a response signal, as referenced generally at 110, while a wireless communications network service is unavailable. Emergency modes of operation, such as a present signal mode or modified present signal mode, for example, will be described in greater detail below. Pilot signal 109 may, for example, be communicated via any suitable cellular frequency band applicable to a particular radio access technology (RAT) featured in wireless device 112, mobile device 102, etc., such as cdma2000, GSM, or the like.

In some instances, pilot signal 109 may comprise, for example, an overhead message having an indication of an emergency condition, such as an emergency-related parameter, designation, message, or the like, which may facilitate or support broadcasting response signal 110 by mobile device 102. Response signal 110 may comprise, for example, any suitable alert or notification capable of guiding ERT or other search and rescue party 114 to a location of a user associated with mobile device 102. For example, depending on an implementation, response signal 110 may comprise an audio signal, an encoded RF signal, an ultrasonic signal, a visual signal, a standard present signal, etc. indicative of a location of mobile device 102. In some instances, response signal 110 may, for example, be capable of being broadcasted by mobile device 102 while inside an operational range of a wireless communications network service while such a wireless communications network service is unavailable. Of course, these are merely details relating to response signal 110 that may be broadcasted by mobile device 102, and claimed subject matter is not limited in this regard.

In an implementation, in response to receiving response signal 110, wireless device 112 may, for example, transmit a message to mobile device 102 so as to invoke an emergency mode of operation, such as a present signal mode, modified present signal mode, or any combination thereof. At times, an emergency mode of operation may, for example, be invoked automatically, such as without user input. Similarly to pilot signal 109, here, a transmitted message may comprise, for example, an overhead message having an indication of an emergency condition, such as an emergency-related parameter, designation, message, or the like. A present signal mode may comprise, for example, a rescue mode capable of broadcasting a signal to enable guiding wireless device 112 to a location of mobile device 102 while a wireless communications network service is unavailable. Likewise, this broadcasted signal may comprise, for example, any suitable alert or notification, such as an audio signal, an encoded RF signal, an ultrasonic signal, a visual signal, just to name a few, or any combination thereof.

In some instances, a broadcasted signal may comprise, for example, a standard "present" signal transmitted by mobile device 102 to announce its presence in an area in accordance with one or more current communication standards. A standard "present" signal may comprise, for example, an encoded RF signal indicative of a location of mobile device 102, provide a unique identification number, physical condition of a user (e.g., alertness, responsiveness, etc.), associated ambient environment, or the like. A standard "present" signal may, for example, be implemented (e.g., transmitted, received, etc.) using any suitable air interface for cellular communications that may be applicable to a RAT featured on mobile device 102, geographic region associated with signaling environment 100, or the like. As a way of illustration, a standard "present" signal may, for example, be implemented in accordance with an IS-95, IS-856, IS-2000, or like protocols described, for example, in documents from a consortium named "3rdGeneration Partnership Project" (3GPP), "3rd Generation Partnership Project 2" (3GPP2), etc. that are publicly available. Of course, these are merely examples relating to a standard "present" signal, and claimed subject matter is not limited in this regard.

In an implementation, mobile device 102 may broadcast a signal to enable guiding wireless device 112 to a location of mobile device 102 in any suitable manner, such as repeatedly or recurrently, for a certain time period, in any suitable sequence, at any pre-defined time intervals, or the like until rescue arrives. For example, a signal may be broadcasted in a certain signaling pattern, such as once every three seconds. In some instances, a signaling pattern may comprise, for example, transmitting six signals within one minute, then pausing for one minute, and repeating the pattern, just to illustrate another possible implementation. Also, a broadcasted signal may be transmitted continually, for example, or periodically so as to conserve battery power. Depending on an implementation, a broadcasted signal may have, for example, a unidirectional radiation pattern, omnidirectional radiation pattern, or any combination thereof. Claimed subject matter is not limited to these particular broadcasted signals, time intervals, or patterns, of course.

In at least one implementation, wireless device 112 may transmit a message to mobile device 102 to invoke a modified present signal mode, such as automatically or without user input. It should be noted that a message may be transmitted by wireless device 112 while broadcasting pilot-type signal 109 or in response to receiving response signal 110. Similarly, here, a message may comprise an indication of an emergency condition capable of invoking an emergency mode of operation, such as a modified present signal mode, for example. Based, at least in part, on an invoked emergency mode, mobile device 102 may initiate a transmission of an appropriate broadcast signal in a suitable manner, such as continually, periodically, etc. without waiting for another (e.g., next, etc.) pilot-type signal from wireless device 112. In some instances, a suitable broadcast signal may comprise, for example, a modified "present" signal indicative of a location of mobile device 102 (and an associated owner) and transmitted while a wireless communications network service is unavailable, such as without waiting for a pilot-type or like signal from base station 108, as per current standards mentioned above. In other words, at times, it may be advantageous to change or modify one or more current cellular communication standards. For example, it may be desirable to implement a "Modified Condition for 'Present' Signal" standard that may allow mobile device 102 located inside an operational range of a cellular or like wireless communications network to invoke a modified present signal mode. As such, in response to a receipt of a single pilot-type signal (e.g., signal 109, etc.), a mobile device (e.g., mobile device 102, etc.) may initiate a transmission of a suitable broadcast signal despite not being able to receive another pilot-type or like signals or otherwise "hear" an available or active wireless communications network.

In some instances, wireless device 112 may comprise a peer device. In this context, "peer device" may refer to one or more special purpose computing platforms or apparatuses having one or more relatively similar or equipotent functionalities or features that may facilitate or support one or more processes or operations for locating mobile device 102. Peer devices may comprise, for example, mobile devices, as defined above, capable of communicating with other devices, peer or otherwise, through wireless transmission or receipt of information. As a way of illustration, peer devices may include, for example, cellular telephones, smart telephones, personal tracking devices, femtocells, personal navigation devices, survival radios, search and rescue transponders, radio direction finders, or the like. It should be appreciated, however, that these are merely examples of peer devices that may be used, at least in part, to facilitate or support locating a victim via first responder's device 112, and that claimed subject matter is not limited in this regard.

Thus, in some instances, pilot signal 109, response signal 110, or other signals communicated between mobile device 102 and wireless devices 112 may comprise, for example, peer-to-peer-type signals. As used herein, "peer-to-peer-type signal" may refer to one or more suitable wireless signals that may be communicated directly between peer devices, such as, for example, while a wireless communications network service is unavailable. At times, a peer-to-peer-type signal may comprise, for example, an encoded RF signal, standard present signal, or like radio signal capable of being detected or processed in some manner by a peer device without utilizing a cellular provider network, wireless ad-hoc network, wireless safety network, wireless emergency communications network, or the like. For example, a peer-to-peer-type signal from mobile device 102 may comprise a one-way signal encoded in some manner with suitable information (e.g., a cell phone ID or call sign, cell phone location, user-related information, etc.) that a peer device (e.g., wireless device 112, etc.) may be capable of reading or decoding to determine or obtain an associated victim's location, condition, etc., just to illustrate one possible implementation. In some instances, such as with respect to a standard present signal, for example, a peer device (e.g., wireless device 112, etc.) may be capable of advantageously receiving, processing, decoding, etc. the signal without utilizing a specialized distress or like emergency equipment (e.g., a Cospas-Sarsat compatible emergency locator, SAR frequency device, etc.). Of course, a peer-to-peer-type signal is merely an example of a signal that may be transmitted by a peer device, and claimed subject matter is not limited in this regard.

At times, in addition to an encoded signal reading capability mentioned above, peer devices 112 may feature a radio direction finding (RDF) capability that may be utilized, at least in part, to determine a direction to a transmitting source, such as mobile device 102, for example, using appropriate techniques. In some instances, peer devices 112 may comprise, for example, a radio-magnetic indicator (RMI) that may provide a relative bearing to or from mobile device 102 to EMT or other rescue party 114 (e.g., via a display, etc.). At times, such as if mobile device 102 is transmitting a signal comprising one or more sound waves in an ultrasonic range, for example, peer devices 112 may feature suitable sound waves-related technology (e.g., ultrasonic sensors, etc.) to determine location of mobile device 102, as another possible example.

As previously mentioned, peer devices 112 may be associated with a suitable rescue or like aircraft and may comprise, for example, on-board RF receivers, dashboard RMIs, automatic direction finders (ADFs), or the like, as referenced generally at 116. These peer devices 112 may assist ERTs or other search and rescue parties 114 with locating the origin of a signal transmitted by mobile device 102 (e.g., signal 110, etc.) by, for example, performing a radio station passage operation, conducting a visual inspection of a geographic area, or the like. In some instances, peer devices 112 associated with an aircraft may identify how many broadcast signals are present in an affected geographic area and may communicate findings to one or more ground teams, for example, which may "zero-in" on a victim's location using one or more appropriate techniques. As also illustrated, one or more audio or visual broadcast signals, such as camera flashes, screen activations, etc., referenced at 118, may help in alerting rescue animals or pointing ERT personnel not carrying peer device 112 toward a location of mobile device 102. This may, for example, provide one or more alternative or supplemental options for effectively conducting search and rescue.

Figure 2:
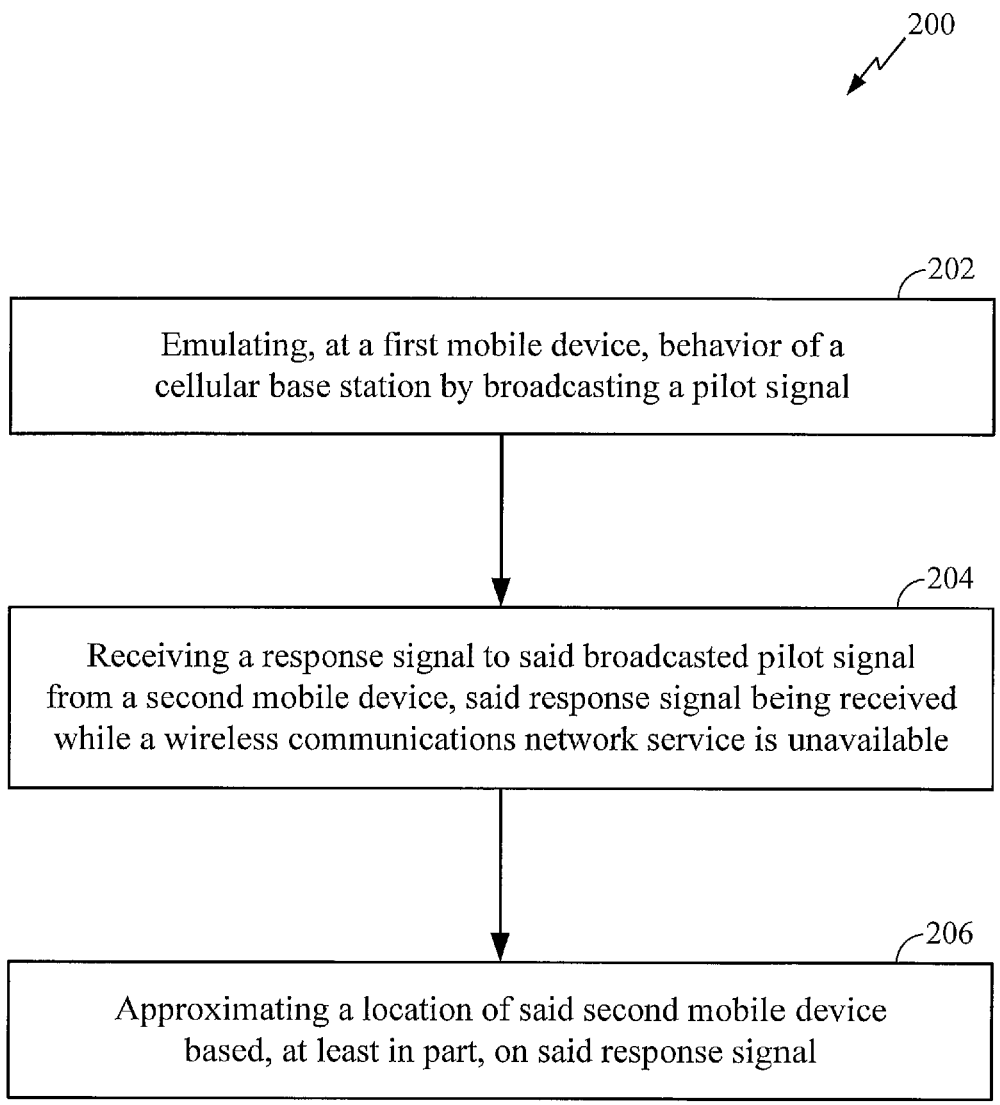
FIG. 2 is a flow diagram illustrating an example process for locating a victim via a first responder's device according to an implementation.

Attention is now drawn to FIG. 2, which is a flow diagram illustrating an implementation of an example process 200 that may be performed, in whole or in part, to facilitate or support one or more operations or techniques for locating a victim via a first responder's device, such as wireless device 112 of FIG. 1, for example. It should be appreciated that even though one or more operations are illustrated or described concurrently or with respect to a certain sequence, other sequences or concurrent operations may also be employed. In addition, although the description below references particular aspects or features illustrated in certain other figures, one or more operations may be performed with other aspects or features.

Example process 200 may begin at operation 202, for example, with emulating, at a first mobile device, behavior of a cellular base station by broadcasting a pilot signal. As discussed above, a first mobile device may be associated with a first responder, such as a member of an FRT, ERT, etc. and may comprise, for example, a wireless device capable of broadcasting a pilot signal in one or more frequency bands (e.g., GSM, CDMA, etc.). In some instances, a pilot signal may comprise, for example, an overhead message having an indication of an emergency condition, such as an emergency-related parameter, designation, notification, or the like. For example, an overhead message may include a notification or indication like, "emergency condition is active," "invoke a present signal mode," "invoke a modified present signal mode," etc., just to illustrate a few possible implementations. In other words, at times, it may be advantageous to change or modify a current cellular communication standard, such as by changing or modifying content of an overhead message, for example, so as to include a suitable indication of an emergency condition triggering an appropriate response from a mobile device.

In some instances, an overhead message having an indication of an emergency condition may be processed or "read" in some manner by a mobile device associated with a victim. This may, for example, trigger or activate an appropriate application hosted on a victim's mobile device, thus, enabling the device to invoke a present signal mode, modified present signal mode, broadcast a signal indicative of a location, etc., or any combination thereof. For example, at times, an emergency mode of operation may activate flashes from a camera or phone screen, audible or ultrasonic siren tones, etc., which may facilitate or support locating the victim by an ERT. In at least one implementation, an invoked emergency mode of operation may, for example, enable a mobile device associated with a victim to emulate a behavior of a cellular base station by broadcasting a pilot signal to other mobile devices (e.g., to elicit a response, etc.) located in a sufficiently close proximity. This may help with locating victims of these other mobile devices if a pilot signal from a first responder's mobile device is attenuated or affected in some manner (e.g., insufficient, weak, fragmentary, etc.), for example, so as to preclude eliciting a response, invoking an emergency mode of operation, etc. For example, at times, a pilot signal may be insufficient or weak if a victim associated with a mobile device is buried under the rubble, covered by deep snow, or the like.

In addition, it may be advantageous to change or modify a current cellular communication standard by implementing, for example, various types of a pilot-type signal, message, or the like. For example, depending on an implementation, a first responder's mobile device may broadcast a shorter message, longer message, or any combination thereof in any suitable sequence. Thus, in an implementation, a shorter message may comprise, for example, an emergency declaration in accordance with the 3GPP's Earthquake and Tsunami Warning System Requirements and Solutions (ETWS) protocol, which is publicly available, an update for time of day, a command to change a power state in accordance with a scheduled receiver wake-up time, message revision number, critical level number, security signature of a message, or the like. In some instances, a shorter message may comprise, for example, an acknowledgement request to verify receipt of the message or any part of the message by a victim's mobile device. In addition, as was indicated, a shorter message may comprise, for example, a request to provide a condition of a victim's ambient environment, physical condition of a victim, or the like. Information obtained in response to a shorter message or associated requests may be used, at least in part, to set a level of triage, for example, coordinate an order of assignment of scheduling of a subsequent message, such as a longer message, for example, having more detailed emergency-related information.

A longer message may comprise, for example, a type of an emergency (e.g., a tornado, tsunami, etc.), its expected duration or severity, affected coverage area, weather status or forecast, map information for emergency services (e.g., medical, food, or clothing distribution area, etc.), message number for update comparisons, message security signature, or the like. In some instances, a longer message may, for example, repeat all or part of information transmitted via a shorter message. In at least one implementation, a longer message may be broadcasted immediately after a broadcast of a shorter message, such as via lower power directed means, for example. Optionally or alternatively, a longer message may be broadcasted via a higher powered transmitter and may be repeated in accordance with a suitable broadcasting schedule to cover a larger area. At times, to conserve power, a higher powered transmitter may communicate a broadcast message on a periodic basis with a lower duty cycle. Also, a victim's mobile device wake-up schedule may, for example, be set (e.g., via a transmitted message, etc.) to match a transmissions schedule, such that most or all broadcast communications occur substantially simultaneously, which may help to conserve power for the victim's mobile device, first responder's mobile device, or other associated device. As previously mentioned, these one or more messages may, for example, be implemented in conformance with the 3GPP protocol described in the Release 8, Section 10.5 for ETWS, which is publicly available. Claimed subject matter is not so limited, of course. Any other suitable protocols or solutions facilitating or supporting applicable emergency notifications may be utilized, in whole or in part.

With regard to operation 204, a response signal to a broadcasted pilot signal may, for example, be received from a second mobile device. As was indicated, in some instances a response signal may, for example, be received while a wireless communications network service is unavailable. In at least one implementation, a second mobile device may comprise, for example, a mobile device associated with a victim of a natural calamity, environmental disaster, or the like, such as mobile device 102 of FIG. 1. A response signal may comprise, for example, any suitable alert or notification indicative of a location of a second mobile device and capable of guiding an ERT or like search and rescue party to a location of the device. In some instances, a response signal may comprise, for example, a standard present signal transmitted by a second mobile device to announce its presence in a particular area or location, such as while inside an operational range of a wireless communications network service. As previously mentioned, at times, a response signal may comprise, for example, a one-way peer-to-peer broadcast signal capable of being transmitted by a second mobile device directly to one or more peer devices while a wireless communications network service is unavailable. As was also indicated, in some instances, a response signal may comprise, for example, a modified present signal transmitted by a second mobile device to announce its presence in a particular area or location.

At operation 206, a location of a second mobile device, such as mobile device 102 of FIG. 1, for example, may be approximated based, at least in part, on a response signal. As previously mentioned, a response signal may comprise an audio signal, an encoded radio frequency (RF) signal, an ultrasonic signal, a visual signal, or any combination thereof. A response signal may be transmitted simultaneously with another signal (e.g., an audio and visual signals transmitted together, etc.), in any suitable sequence, at any pre-defined time intervals, in a certain signaling pattern, or the like. Also, a response signal may be transmitted continually, for example, or periodically so as to conserve battery power. In some instances, a first mobile device may decode a response signal, such as in a manner discussed above, and a location of a second mobile device may be estimated using one or more appropriate techniques, such as triangulation, trilateration, via a strength or directionality of a response signal, or the like.

In an at least one implementation, based, at least in part, on a received response signal, a first mobile device may be capable of determining an identity of a user of a second mobile device. For example, a response signal may comprise one or more user-identifying or user-related information, such as a user subscription ID, mobile number, or the like. Based, at least in part, on this information, an appropriate database, such as a back-end, etc. database hosting a user account associated with a cellular provider of a wireless communications network service may be accessed, for example, and an identity of the user may be determined.

In some instances, such as, for example, after receiving a message indicative of an acknowledgment that a response signal has been received by a first mobile device, pilot signal, etc., a second mobile device may change its power state in a suitable manner. For example, a second mobile device may transition into a low-power or sleep mode, vary or adjust in some manner a time period between transmissions of a suitable signal while in an emergency mode of operation, or the like. As a way of illustration, a second mobile device may, for example, increase an interval or period between signal transmissions after receiving an acknowledgement from a first responder's device that a response signal has been received. As another possible example, having received a pilot signal, a second mobile device may, for example, increase a time interval between transmissions of a broadcast signal to save power. For example, a second mobile device may transmit a signal once every hour (e.g., at the same time, etc.) for a certain number of hours (e.g., for 10 hours, etc.), then increase a time interval between transmissions for another number of hours (e.g., one transmission every two hours, etc.), or the like. As yet another example, an overhead message may enable a second mobile device to set or reset an associated sleep timer to a longer sleep interval, such that the device may "wake up" at a specific time (e.g. every 75 minutes, twice a day at 3:15 a.m. and 3:15 p.m., etc.). This may, for example, also help to conserve battery power, may facilitate or support more effective or efficient search and rescue efforts by setting an order of broadcasting response signals from a plurality of mobile devices, thus, allowing an ERT to prioritize responses to a potentially large number of associated victims.

In an implementation, a first mobile device may, for example, generate an electronic record with respect to one or more second mobile devices based, at least in part, on one or more response signals. For example, an electronic record may comprise one or more entries (e.g., in a log, table, etc. format) reflecting an identity of a second mobile device, associated user, geographic location, or the like. An electronic record may, for example, be stored in a suitable manner, such as in an external or internal database (e.g., a memory, etc.) accessible by a first mobile device, on a suitable server, or the like. At times, an electronic record may be communicated to another mobile device, such as a first responder's device in a relatively close proximity to a victim, for example, to pinpoint the victim's location, share information, or otherwise facilitate or support rescue. An electronic record may be time-stamped, such as with time information derived from a response signal, for example, and may be used, at least in part, to correlate time of locating a second mobile device with its identity, condition of its owner, etc., which may facilitate or support coordination of search and rescue efforts, for example. To illustrate, based, at least in part, on a time-stamped record (e.g., time of a response signal, condition of a user, etc.), an order of rescue of victims may, for example, be established by considering availability, capability, etc. of ERT personnel proximate to victims, or the like.

Figure 3:
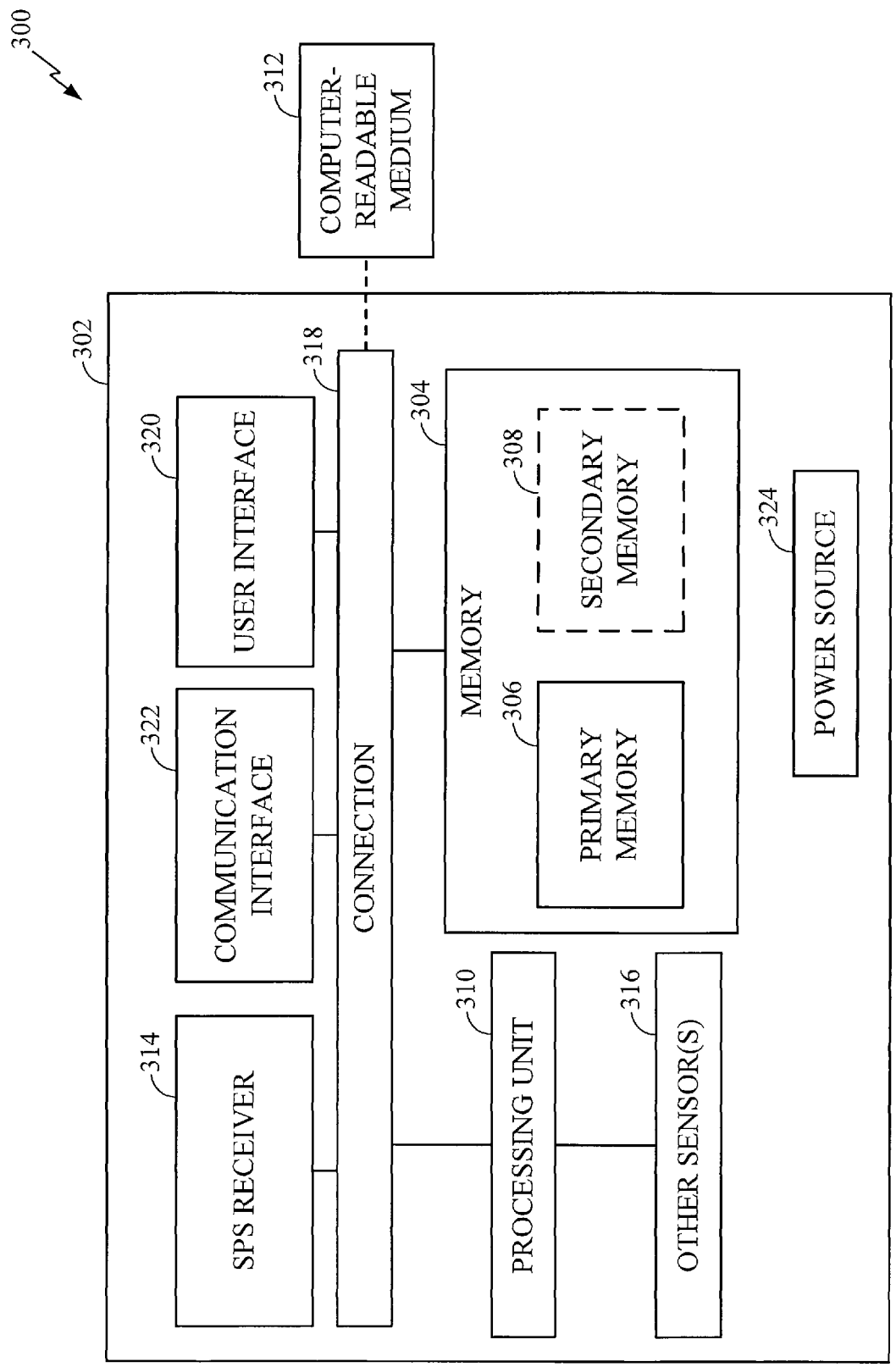
FIG. 3 is a schematic diagram illustrating an example computing environment associated with a mobile device according to an implementation.

FIG. 3 is a schematic diagram illustrating an implementation of an example computing environment 300 that may include one or more mobile devices capable of partially or substantially implementing or supporting one or more operations or processes for locating a victim via a first responder's device. It should be appreciated that all or part of various devices shown in computing environment 300, processes, or methods, as described herein, may be implemented using various hardware, firmware, or any combination thereof along with software.

Example computing environment 300 may comprise, for example, a mobile device 302 that may include one or more features or aspects of mobile device 102, wireless device 112, etc. of FIG. 1, though claimed subject matter is not so limited. For example, mobile device 302 may be capable of communicating with one or more other devices, mobile or otherwise, via a cellular telephone network, the Internet, mobile ad-hoc network, wireless sensor network, peer-to-peer Example computing environment 300 may include, for example, a mobile device 302, which may be capable of communicating directly with one or more other devices (e.g., wireless devices, peer devices, etc.) in some manner, such as while a wireless communications network service is unavailable. It should be noted that in some instances, such as during typical cellular or like wireless network-related communications, mobile device 302 may be communicatively coupled to any number of other devices, mobile or otherwise, via a suitable communications network, such as a cellular telephone network, the Internet, mobile ad-hoc network, wireless sensor network, or the like. In an implementation, mobile device 302 may be representative of any electronic device, appliance, or machine that may be capable of exchanging wireless information. For example, mobile device 302 may include one or more computing devices or platforms associated with, for example, cellular telephones, satellite telephones, smart telephones, personal digital assistants (PDAs), laptop computers, personal entertainment systems, e-book readers, tablet personal computers (PC), personal audio or video devices, personal navigation devices, or the like. In certain example implementations, mobile device 302 may take the form of one or more integrated circuits, circuit boards, or the like that may be operatively enabled for use in another device. Thus, unless stated otherwise, to simplify discussion, various functionalities, elements, components, etc. are described below with reference to mobile device 302 may also be applicable to other devices not shown so as to support one or more processes associated with example computing environment 300.

Although not shown, optionally or alternatively, there may be additional devices, mobile or otherwise, communicatively coupled to mobile device 302 to facilitate or otherwise support one or more processes associated with computing environment 300, such as discussed above. For example, computing environment 300 may include various computing or communication resources or devices capable of obtaining all or part of position or location information with regard to mobile device 302 based, at least in part, on one or more wireless signals associated with a positioning system, location-based service, or the like. Location information may, for example, be stored in some manner in memory 304 along with other suitable or desired information, such as an electronic record of located devices, identities of victims, or the like.

Memory 304 may represent any suitable information storage medium. For example, memory 304 may include a primary memory 306 and a secondary memory 308. Primary memory 306 may include, for example, a random access memory, read only memory, etc. While illustrated in this example as being separate from a processing unit 310, it should be appreciated that all or part of primary memory 306 may be provided within or otherwise co-located/coupled with processing unit 310. Secondary memory 308 may include, for example, the same or similar type of memory as primary memory or one or more information storage devices or systems, such as, for example, a disk drive, an optical disc drive, a tape drive, a solid state memory drive, etc. In certain implementations, secondary memory 308 may be operatively receptive of, or otherwise enabled to be coupled to, a computer-readable medium 312.

Computer-readable medium 312 may include, for example, any medium that may store or provide access to information, code or instructions (e.g., an article of manufacture, etc.) for one or more devices associated with computing environment 300. For example, computer-readable medium 312 may be provided or accessed by processing unit 310. As such, in certain example implementations, the methods or apparatuses may take the form, in whole or part, of a computer-readable medium that may include computer-implementable instructions stored thereon, which may be executed by at least one processing unit or other like circuitry so as to enable processing unit 310 or the other like circuitry to perform all or portions of a location determination processes or any other processes to facilitate or support one or more operations or techniques discussed herein. In certain example implementations, processing unit 310 may be capable of performing or supporting other functions, such as communications, navigations, video or like gaming, or the like.

It should be understood that a storage medium, such as memory 304, computer-readable medium 312, etc. may typically, although not necessarily, be non-transitory or may comprise a non-transitory device. In this context, a non-transitory storage medium may include, for example, a device that is physical or tangible, meaning that the device has a concrete physical form, although the device may change state. For example, one or more electrical binary digital signals representative of information, in whole or in part, in the form of zeros may change a state to represent information, in whole or in part, as binary digital electrical signals in the form of ones, to illustrate one possible implementation. As such, "non-transitory" may refer, for example, to any medium or device remaining tangible despite this change in state.

Processing unit 310 may be implemented in hardware or a combination of hardware and software. Processing unit 310 may be representative of one or more circuits capable of performing at least a portion of information computing technique or process. By way of example but not limitation, processing unit 310 may include one or more processors, controllers, microprocessors, microcontrollers, application specific integrated circuits, digital signal processors, programmable logic devices, field programmable gate arrays, or the like, or any combination thereof.

Mobile device 302 may include various sensors, components, or circuitry, such as, for example, an SPS receiver 314 capable of acquiring wireless signals from a satellite positioning system (SPS), such as the global positioning system (GPS) or other like Global Navigation Satellite System (GLASS), cellular base station, location beacon, another mobile device, or the like. Although not shown, mobile device 302 may include a location-tracking unit that may initiate a position fix of mobile device 302, for example, based, at least in part, on one or more received or acquitted wireless signals. In some implementations, a location-tracking unit may be at least partially integrated with a suitable processing unit, such as processing unit 310, for example, though claimed subject matter is not so limited. Mobile device 302 may include one or more other sensors 316, such as, for example, an accelerometer, magnetometer, ambient light detector, camera, microphone, temperature sensor, atmospheric pressure sensor, gyroscope, health sensors, proximity sensors, etc. to facilitate or otherwise support one or more processes associated with computing environment 300. For example, sensors may provide analog or digital signals to processing unit 310. Although not shown, it should be noted that mobile device 302 may include an analog-to-digital converter (ADC) for digitizing analog signals from one or more sensors. Optionally or alternatively, such sensors may include a designated (e.g., an internal, etc.) ADC(s) to digitize signals, although claimed subject matter is not so limited.

Mobile device 302 may include one or more connections 318 (e.g., buses, lines, conductors, optic fibers, etc.) to operatively couple various circuits together, and a user interface 320 (e.g., display, touch screen, keypad, buttons, knobs, microphone, speaker, trackball, information port, etc.) to receive user input, provide information to a user, or the like. Mobile device 302 may further include a communication interface 322 (e.g., wireless transmitter or receiver, modem, antenna, etc.) to allow for communication with one or more other devices or systems over one or more suitable communications networks, peer-to-peer, etc., as was indicated.

In an implementation, mobile device 302 may include a power source 324 to provide power to some or all of the sensors, components, or circuitry. Power source 324 may be a portable power source, such as a battery, for example, or may comprise a fixed power source, such as an outlet (e.g. in a house, electric charging station, car, etc.). It should be appreciated that power source 324 may be integrated into (e.g., built-in, etc.) or otherwise supported by (e.g., stand-alone, etc.) mobile device 302. Although not shown, mobile device 302 may also include a memory or information buffer to collect suitable or desired information, such as, for example, location coordinates, user-related information, or the like.

Methodologies described herein may be implemented by various means depending upon applications according to particular features or examples. For example, such methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, the methodologies may be implemented with modules (e.g., procedures, functions, etc.) having instructions that perform the functions described herein. Any machine readable medium tangibly embodying instructions may be used in implementing the methodologies described herein. For example, software codes may be stored in a memory and executed by a processor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. In at least some implementations, one or more portions of the herein described storage media may store signals representative of data or information as expressed by a particular state of the storage media. For example, an electronic signal representative of data or information may be "stored" in a portion of the storage media (e.g., memory) by affecting or changing the state of such portions of the storage media to represent data or information as binary information (e.g., ones and zeros). As such, in a particular implementation, such a change of state of the portion of the storage media to store a signal representative of data or information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that can be accessed by a computer. By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer or processor thereof. Disk and disc, as used herein, includes compact disc (CD), laser disc, optical disc, digital versatile disc (DVD), floppy disk and blue-ray disc where disks usually reproduce data magnetically, while discs reproduce data optically with lasers.

As discussed above, a mobile device may be capable of communicating with one or more other devices via wireless transmission or receipt of information over various communications networks or in an absence of such networks using one or more wireless communication techniques. Here, for example, typical wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 protocols. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like. It should be noted that these as well as other radio technologies, standards, etc. not listed may be implemented via one or more peer-to-peer communications, as discussed above, such as while a wireless communications network service is unavailable.

As previously mentioned, in some instances, a mobile device may, for example, be capable of communicating with one or more femtocells for the purpose of estimating its location. As used herein, "femtocell" may refer to one or more smaller-size cellular base stations that may be enabled to detect a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example. However, such details relating to femtocells are merely examples, and claimed subject matter is not so limited.

Also, if applicable, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions or data may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising:
   emulating, at a first mobile device, behavior of a cellular base station by broadcasting a pilot signal;
   receiving a response signal to said broadcasted pilot signal from a second mobile device, said response signal being received while a wireless communications network service is unavailable and indicating at least a condition of an associated ambient environment, wherein said condition of said associated ambient environment is indicative of a naturally available light;
   approximating a location of said second mobile device based, at least in part, on said response signal; and
   setting a level of triage for said user based, at least in part, on the information in said response signal.

2. The method of claim 1, and further comprising transmitting, in response to said receiving said response signal, a message to said second mobile device to invoke a present signal mode.

3. The method of claim 2, wherein said present signal mode is capable of broadcasting a signal to enable guiding said first mobile device to said location of said second mobile device while said wireless communications network service is unavailable.

4. The method of claim 2, wherein said message comprises an overhead message having an indication of an emergency condition.

5. The method of claim 2, wherein said message comprises a shorter message comprising at least one of the following: an emergency declaration; an update for time of day; a command to change a power state of said second mobile device; a message revision number; a critical level number; a message security signature; or any combination thereof.

6. The method of claim 2, wherein said message comprises a longer message comprising at least one of the following: a type of an emergency; an expected duration of an emergency; a severity of an emergency; an affected coverage area; a current status of weather; a weather forecast; map information for emergency services; a message number for update comparisons; a message security signature; a shorter message; a part of a shorter message; a command to match a transmissions schedule; or any combination thereof.

7. The method of claim 2, wherein said message comprises said pilot signal.

8. The method of claim 3, wherein said signal comprises at least one of the following: an audio signal; an encoded radio frequency (RF) signal; an ultrasonic signal;
   a visual signal; or any combination thereof.

9. The method of claim 8, wherein said encoded RF signal comprises a standard present RF signal.

10. The method of claim 9, wherein said standard present RF signal comprises a broadcast signal transmitted by said second mobile device to announce its presence in said location while said wireless communications network service is unavailable.

11. The method of claim 2, and further comprising changing a power state of said second mobile device based, at least in part, on said transmitted message from: a normal operational mode to a low-power mode; or a low-power mode to a normal operational mode.

12. The method of claim 2, wherein said transmitted message is indicative of an acknowledgment that said response signal has been received.

13. The method of claim 1, and further comprising transmitting, in response to said receiving said response signal, a message to said second mobile device to transition to a modified present signal mode.

14. The method of claim 1, wherein said approximating comprises estimating a location of said second mobile device based, at least in part, on at least one of the following: a strength of said response signal; a directionality of said response signal; or any combination thereof.

15. The method of claim 1, and further comprising determining an identity of said user of said second mobile device based, at least in part, on said response signal.

16. The method of claim 15, wherein said identity of said user is determined via a user account associated with a cellular provider of said wireless communications network service.

17. The method of claim 1, wherein said first mobile device comprises a peer device enabled to transmit a peer-to-peer-type signal capable of being detected by said second mobile device while said wireless communications network service is unavailable.

18. The method of claim 1, and further comprising changing a power state of said second mobile device based, at least in part, on said broadcasted pilot signal.

19. The method of claim 18, wherein said changing said power state of said second mobile device comprises changing at least one of the following: said power state from a normal operational mode to a low-power mode; said power state from a low-power mode to a normal operational mode.

20. The method of claim 1, and further comprising generating an electronic record with respect to said second mobile device based, at least in part, on said response signal.

21. The method of claim 20, wherein said electronic record comprises at least one entry with respect to the following: said approximated location of said second mobile device; identification information for said second mobile device; or any combination thereof.

22. The method of claim 20, wherein said electronic record is stored in a database accessible by said first mobile device.

23. The method of claim 20, and further comprising communicating said electronic record to a third mobile device to perform said approximating said location of said second mobile device.

24. The method of claim 20, and further comprising time-stamping said electronic record with time information derived from said response signal.

25. The method of claim 24, and further comprising correlating said time information with said approximated location of said second mobile device to coordinate a search and rescue (SAR) operation.

26. The method of claim 1, wherein said wireless communications network service is associated with at least one of the following: a cellular provider network; a wireless ad-hoc network; a wireless safety network; a wireless emergency communications network; a satellite-based search and rescue (SAR) network; or any combination thereof.

27. The method of claim 1, and further comprising broadcasting said pilot signal in multiple frequency bands.

28. The method of claim 1, wherein said pilot signal comprises an overhead message having an indication of an emergency condition and capable of invoking at said second mobile device at least one of the following: a present signal mode; a modified present signal mode; or any combination thereof.

29. The method of claim 1, wherein said response signal being received while inside an operational range of said wireless communications network service.

30. A mobile device comprising:
a wireless transceiver to communicate with a second mobile device; and
at least one processor programmed with instructions to:
emulate behavior of a cellular base station by broadcasting a pilot signal via said wireless transceiver;
receive, at said wireless transceiver, a response signal to said broadcasted pilot signal from said second mobile device, said response signal being received while a wireless communications network service is unavailable and indicating at least a condition of an associated ambient environment, wherein said condition of said associated ambient environment is indicative of a naturally available light;
approximate a location of said second mobile device based, at least in part, on said response signal; and
set a level of triage for said user based, at least in part, on the information in said response signal.

31. The apparatus of claim 30, wherein said at least one processor further to transmit, in response to said received response signal, a message to said second mobile device to invoke a present signal mode.

32. The apparatus of claim 31, wherein said present signal mode is capable of broadcasting a signal to enable guiding said mobile device to said location of said second mobile device while said wireless communications network service is unavailable.

33. The apparatus of claim 32, wherein said signal comprises at least one of the following: an audio signal; an encoded radio frequency (RF) signal; an ultrasonic signal; a visual signal; or any combination thereof.

34. The apparatus of claim 32, wherein said present signal mode is invoked while inside an operational range of said wireless communications network service.

35. The apparatus of claim 30, wherein said at least one processor is further to determine an identity of said user of said second mobile device based, at least in part, on said response signal.

36. The apparatus of claim 30, wherein said at least one processor is further to change a power state of said second mobile device based, at least in part, on said broadcasted pilot signal.

37. The apparatus of claim 30, wherein said at least one processor is further to generate an electronic record with respect to said second mobile device based, at least in part, on said response signal.

38. The apparatus of claim 30, wherein said at least one processor is further to communicate said electronic record to a third mobile device to said approximate said location of said second mobile device.

39. The apparatus of claim 30, wherein said at least one processor is further to time-stamp said electronic record with time information derived from said response signal.

40. An apparatus comprising:
means for emulating, at a first mobile device, behavior of a cellular base station by broadcasting a pilot signal and for receiving a response signal to said broadcasted pilot signal from a second mobile device, said response signal being received while a wireless communications network service is unavailable and indicating at least a condition of an associated ambient environment, wherein said condition of said associated ambient environment is indicative of a naturally available light;
means for approximating a location of said second mobile device based, at least in part, on said response signal and for setting a level of triage for said user based, at least in part, on the information in said response signal.

41. The apparatus of claim 40, wherein said means for emulating and for receiving further transmit, in response to said receiving said response signal, a message to said second mobile device to invoke a present signal mode.

42. The apparatus of claim 41, wherein said present signal mode is capable of broadcasting a signal to enable guiding said first mobile device to said location of said second mobile device while said wireless communications network service is unavailable.

43. The apparatus of claim 42, wherein said signal comprises at least one of the following: an audio signal; an encoded radio frequency (RF) signal; an ultrasonic signal; a visual signal; or any combination thereof.

44. The apparatus of claim 43, wherein said encoded RF signal comprises a standard present RF signal.

45. The apparatus of claim 44, wherein said standard present RF signal comprises a broadcast signal transmitted by said second mobile device to announce its presence in said location while said wireless communications network service is unavailable.

46. The apparatus of claim 41, wherein said present signal mode is invoked while inside an operational range of said wireless communications network service.

47. The apparatus of claim 40, wherein said means for emulating and for receiving further transmit, in response to said receiving said response signal, a message to said second mobile device to transition to a modified present signal mode.

48. The apparatus of claim 40, wherein said means for approximating estimate a location of said second mobile device based, at least in part, on at least one of the following: a strength of said response signal; a directionality of said response signal; or any combination thereof.

49. The apparatus of claim 40, wherein said means for emulating and for receiving further determine an identity of said user of said second mobile device based, at least in part, on said response signal.

50. The apparatus of claim 49, wherein said identity of said user is determined via a user account associated with a cellular provider of said wireless communications network service.

51. The apparatus of claim 40, wherein said first mobile device comprises a peer device enabled to transmit a peer-to-peer-type signal capable of being detected by said second mobile device while said wireless communications network service is unavailable.

52. The apparatus of claim 40, wherein said means for emulating and for receiving further change a power state of said second mobile device based, at least in part, on said broadcasted pilot signal.

53. The apparatus of claim 52, wherein said power state is changed from a normal operational mode to a low-power mode.

54. The apparatus of claim 52, wherein said power state is changed from a low-power mode to a normal operational mode.

55. The apparatus of claim 40, wherein said means for emulating and for receiving further generate an electronic record with respect to said second mobile device based, at least in part, on said response signal.

56. The apparatus of claim 55, wherein said electronic record comprises at least one entry with respect to the following: said approximated location of said second mobile device; identification information for said second mobile device; or any combination thereof.

57. The apparatus of claim 55, wherein said electronic record is stored in a database accessible by said first mobile device.

58. The apparatus of claim 55, wherein said means for emulating and for receiving further communicate said electronic record to a third mobile device to perform said approximating said location of said second mobile device.

59. The apparatus of claim 55, wherein said means for emulating and for receiving further time-stamp said electronic record with time information derived from said response signal.

60. The apparatus of claim 59, wherein said means for emulating and for receiving further correlate said time information with said approximated location of said second mobile device to coordinate a search and rescue (SAR) operation.

61. The apparatus of claim 40, wherein said wireless communications network comprises at least one of the following: a cellular provider network; a wireless ad-hoc network; a wireless safety network; a wireless emergency communications network; a satellite-based search and rescue (SAR) network; or any combination thereof.

62. The apparatus of claim 40, wherein said means for emulating and for receiving further broadcast said pilot signal in multiple frequency bands.

63. An article comprising:
a non-transitory storage medium having instructions stored thereon executable by a special purpose computing platform at a first mobile device to:
initiate broadcast of a pilot signal to emulate behavior of a cellular base station;
obtain a response signal to said broadcasted pilot signal received from a second mobile device, said response signal being received while a wireless communications network service is unavailable and indicating at least a condition of an associated ambient environment, wherein said condition of said associated ambient environment is indicative of a naturally available light;
approximate a location of said second mobile device based, at least in part, on said response signal; and
set a level of triage for said user based, at least in part, on the information in said response signal.

64. The article of claim 63, wherein said storage medium further comprises instructions executable by said special purpose computing platform to initiate transmission, in response to said received response signal, of a message to said second mobile device to invoke a present signal mode.

65. The article of claim 64, wherein said present signal mode is capable of broadcasting a signal to enable guiding said first mobile device to said location of said second mobile device while said wireless communications network service is unavailable.

66. The article of claim 63, wherein said storage medium further comprises instructions executable by said special purpose computing platform to determine an identity of said user of said second mobile device based, at least in part, on said response signal.

67. The article of claim 63, wherein said storage medium further comprises instructions executable by said special purpose computing platform to initiate change in a power state of said second mobile device based, at least in part, on said broadcasted pilot signal.

* * * * *